CABLE STRAIN RELIEF DEVICE

Original Filed April 1, 1970

INVENTOR.
WOLFGANG W. JENSEN

BY
Flehr, Hohbach, Test, Albritton & Herbert
ATTORNEYS

United States Patent Office

Re. 27,986
Reissued Apr. 23, 1974

27,986

CABLE STRAIN RELIEF DEVICE

Wolfgang W. Jensen, Capitola, Calif., assignor to Plantronics, Inc., Santa Cruz, Calif.

Original No. 3,604,069, dated Sept. 14, 1971, Ser. No. 24,495, Apr. 1, 1970. Application for reissue May 29, 1973, Ser. No. 364,804
Int. Cl. A44b *13/02, 21/00*
U.S. Cl. 24—73 SH 6 Claims

Matter enclosed in heavy brackets [ ] appears in the original patent but forms no part of this reissue specification; matter printed in italics indicates the additions made by reissue.

ABSTRACT OF THE DISCLOSURE

A strain relief device for supporting a cable used with a communications headset of the type worn on a user's ear. The device provides freedom of movement and relief from strain resulting from the weight of the cable. A transversely bored plunger is slidably mounted in a transversely bored housing with slots provided through these two parts for receiving the cable. The plunger is yieldably urged in a direction to releasably grip the cable in the desired position when the housing is clipped to the user's wearing apparel. The device facilitates rapid adjustment of cable position by either sliding the cable relative to the housing, or pivoting the housing with respect to the clip. Means are provided to prevent unintended separation of the cable from the device during this adjustment.

BACKGROUND OF THE INVENTION

Headsets have been provided for radio telephone operators, aircraft crewmen, or other personnel for use in communications systems. These headsets have either been mounted to the user's head by means of a headband or other supporting arrangement, or have been of the self-supporting type adapted to fit over the user's ear. The cable carrying the leads to the headset typically extends from the headset and hangs freely across the body of the user. The weight of this cable pulling against the headset is somewhat uncomfortable to the user, especially where the headset is used over a long period of time. Moreover, where the user is active and moves his body or turns his head frequently throughout his work activities, then the freely hanging cable oftentimes interferes with his movements and is otherwise a nuisance. The expediency of merely affixing the cable to the user's wearing apparel is not entirely satisfactory where the user changes positions frequently, since this requires adjusting and readjusting of the free length of the cable. Thus, the need has been recognized for a small, simple and inexpensive device for supporting a headset cable in a manner relieving the strain or weight of the cable from the user's head, and also which facilitates easy and fast adjustment of cable position and length.

SUMMARY OF THE INVENTION AND OBJECTS

It is a general object of the invention to provide a new and improved cable strain relief device for use with communications headsets.

Another object is to provide a device of the type described supporting a headset cable to the apparel of a user and relieving cable weight from the user's head for improved comfort and reduced fatigue.

Another object is to provide a cable strain relief device releasably attached to the apparel of the user and which releasably holds the cable in a position which is readily and easily adjusted through both lengthwise and pivoting adjustments.

Another object is to provide a cable strain relief device of the type described bed which is relatively small and light weight, inexpensive, and comprises a relatively small number of parts.

The invention provides a housing and plunger formed with transverse bores which, when aligned, receive the headset cable. Slots in the housing and plunger facilitate insertion and removal of the cable. A spring in the housing urges the plunger in a direction for gripping the cable against the housing. A stop on the plunger end limits plunger travel to prevent unintended separation of the cable from the housing. Inward displacement of the plunger provides lengthwise adjustment of the cable, while rotation of the housing with respect to a mounting clip provides angular adjustment.

DETAILED DESCRIPTION OF THE PREFERRED EMBODIMENT

Figure 1:
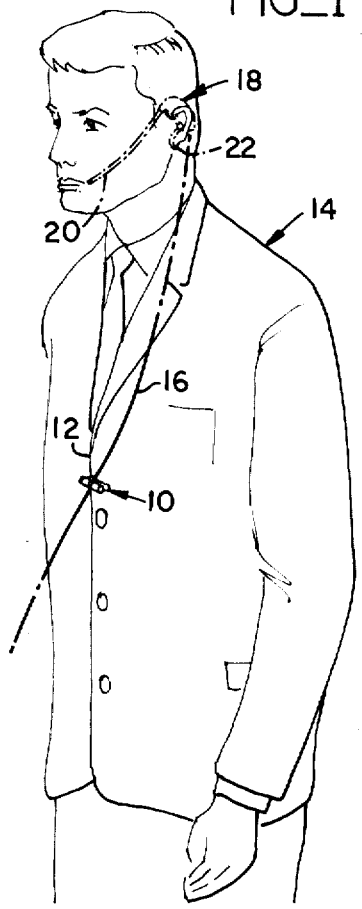
FIG. 1 is a perspective view illustrating a cable strain relief device incorporating features of the invention shown in position on the wearing apparel of a user.

Referring now to the drawings and particularly FIG. 1 a strain relief device in accordance with the invention is illustrated generally at 10. This device is clipped to the coat edge or lapel 12 of a user 14 for supporting a headset cable 16. The cable depends from a communications headset 18, shown in phantom view as mounted above the user's ear. Headset 18 may be of the self-supporting type illustrated in copending application Ser. No. 839,016, filed July 3, 1969. This type of headset is adapted to be supported on the user's ear with a voice tube 20 having its distal end extending to the user's mouth and an acoustic tube 22 insertable into the auditory canal of the user. Cable 16 supplies electrical signals through leads connected with microphone and receiver transducers within the housing of the headset.

Figure 2:
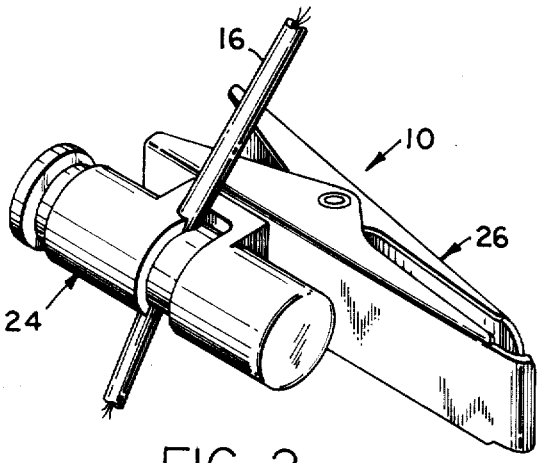
FIG. 2 is an enlarged perspective view of the strain relief device illustrating the use thereof in supporting a headset cable.

Referring to FIG. 2 strain relief device 10 is illustrated in greater detail. Device 10 comprises a cable gripping housing assembly 24 pivotally mounted on a clip assembly 26. Assembly 24 is adapted to releasably grip headset cable 16 for carrying a part of the cable weight when the clip assembly is secured to the user's wearing apparel.

Figure 3:
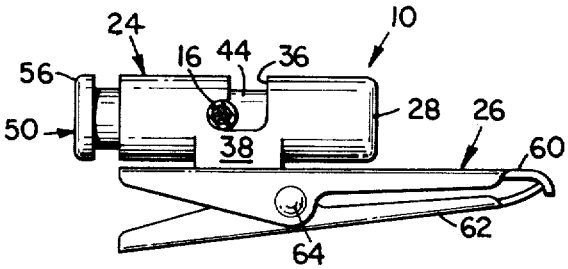
FIG. 3 is a side elevational view of the strain relief device shown in gripping relationship with a cable; and, FIG. 4 is a side elevational view, partially in axial cross section, of the strain relief device.
Figure 4:
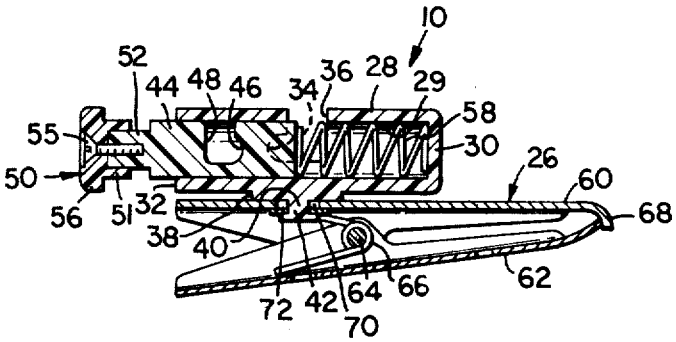

FIGS. 3 and 4 illustrate details of the component elements of device 10. Cable gripping assembly 24 comprises a housing 28, shown as cylindrical, defining an internal cavity 29 having a closed end 30 and an open end 32. A transverse bore 34 is formed through the walls of the housing and is of a diameter sized to cradle or receive headset cable 16, as best illustrated in FIG. 3. A transverse slot 36 is formed through a side of the housing and extends into the bore on the side thereof remote from housing open end 32. Slot 36 is sized with a width adapted to freely permit insertion and removal of the cable. A square boss 38 is molded integral with housing 28 on a side thereof remote from the opening defined by housing slot 36. An integral stud 40 projects from boss 38, and this stud is formed with a locking shoulder 42.

A slide or plunger 44, shown as cylindrical, is mounted for sliding movement within housing cavity 29. A transverse bore 46 is formed in the housing with a diameter sized to cradle the cable, as shown in FIG. 3. A transverse slot 48 is formed on a side of the plunger for registry with housing slot 36, and extends into bore 46 on a side thereof remote from housing [open] *closed* end [32] *30*. An operating button 50 is provided with a skirt 51 defining an internal bore for mounting on a reduced projecting end 52 of the plunger. A self-threading screw 55 is provided to lock the button on the plunger.

The circumferential shoulder 56 of the button cooperates with housing open end 32 in a manner preventing unintended or complete release of the cable from the housing. In the cable gripping position of FIG. 3, shoulder 56 is spaced from housing end 32. For release and longitudinal adjustment of the cable, button 50 is pressed and the plunger displaced inwardly until shoulder 56 stops against the housing. At this point the cable is free to slide along bores 34 and 46 to the desired new position, but right-hand edge of plunger slot 48 has not cleared the left-hand edge of housing slot 36 sufficient to permit removal of the cable through these slots.

Means are provided to yieldably urge plunger 44 in a direction tending to move it out of housing cavity 29. This means may comprise the illustrated compression spring 58 mounted between housing end wall 30 and plunger 44. With a length of the cable in place in the aligned bores of the plunger and housing, spring 58 is effective to urge the plunger outwardly for firmly gripping the cable.

Clip assembly 26 comprises a pair of jaws 60, 62 pivotally mounted together by means of rivet of fastener 64. A coil spring 66 is mounted on fastener 64 with its outwardly projecting ends yieldably urging the clip jaws together at gripping end 68 in a conventional manner for releasably gripping the user's wearing apparel. An opening 70 is provided in upper jaw 60 for mounting the clip assembly over locking shoulder 42 of stud 40. Means are provided for resiliently locking the clip assembly to the train relief device 10. A variety of means would be satisfactory, but preferably a resilient locking ring 72, which may be, for example, a bowed E-ring, is mounted between locking shoulder 42 and the inner surface of jaw 60. The resiliency of E-ring 72 acting against the locking shoulder urges jaw 60 into releasable engagement with the flat surface of housing boss 38. This insures that the selected pivotal position of housing 24 with respect to clip assembly 26 is maintained so that the cable extends in the most comfortable position on the wearer's body. At the same time, the user can easily readjust this positioning by turning the housing with respect to the clip assembly.

For initial assembly and installation on a cable, spring 58 and plunger 44 are mounted in housing cavity 29. The plunger is pushed inwardly far enough to allow the cable to be inserted through the plunger and housing slots. The plunger is then released to permit the spring force to clamp the cable, and button 50 is then fastened on the end of the plunger by screw 55 preventing complete release of the cable.

In use of the strain relief device 10, assume that a cable has been installed and is gripped as illustrated in FIG. 3.

For lengthwise adjustment of the cable, the user may easily grasp housing assembly 24 in one hand and move plunger 44 into the housing against the force of spring 58 until the cable is released. The user then slides the cable to the desired position, releases the plunger, and the cable is again gripped in the new position. The force of spring 58 is effective to move the plunger outwardly and carry the cable into its seated position on the semicircular portions of housing bore 34. The yieldable force of the spring retains the cable in locking engagement between plunger bore 46 and housing bore 34.

Jaws 60, 62 of clip assembly 26 are opened for clipping device 10 to the desired position on the user's wearing apparel providing sufficient cable length between the headset and strain relief device for adequate feedom of movement and comfort. If the user desires to readjust this free cable length, he merely pushes plunger 44 into the housing for releasing cable 16. The cable is then moved lengthwise to the desired position and the plunger is released so that the cable is locked in the most comfortable position. The user may then adjust, if necessary, the angular position of cable 16 by turning housing 24 with respect to clip assembly 26.

From the foregoing it is apparent that there has been provided a new and improved strain relief device for supporting a headset cable to the wearing apparel of a user. The elements are relatively small, simple and inexpensive to build. In [user] *use* the major portion of the weight of the headset cable is supported through a clip arrangement on the user's wearing apparel to reduce the user's fatigue. The cable is maintained in the desired position on the user permitting freedom of body movement without interference from the cable. The cable position with respect to the clip assembly is readily adjusted through both lengthwise and pivotal positioning. Means is provided to prevent unintended separation of the cable from the device.

While the foregoing embodiment is considered to be preferred, it is understood that numerous variations in the details and arrangement of parts, which have been described and illustrated in order to explain the nature of the invention, may be made by those skilled in the art within the spirit and scope of the invention as expressed in the appended claims.

1. A device for adjustably supporting a cable on the wearing apparel of a user, the device including the combination of: a housing having a cavity defining a closed end and an open end, the housing being formed with a transverse bore for receiving a length of the cable and a slot through a side of the housing extending into the bore on a side thereof remote from the [closed] *open* end; a plunger slidably mounted in the housing cavity for movement between a cable gripping position and a cable releasing position, the plunger being formed with a transverse bore for receiving the length of cable and a slot on a side of the plunger extending [to] *into* the plunger bore on a side thereof remote from the housing [open] *closed* end; clip means secured to the housing to releasably engage a portion of said wearing apparel; and, means yieldably urging the plunger to its gripping position to releasably lock the cable between the plunger and housing bores.

2. The invention of claim 1 and further characterized in that said clip means is rotatably mounted with respect to said housing for selective adjustment of the angular position of the length of cable with respect to the clip means.

3. The invention of claim 1 and further including means pivotally mounting said housing on the clip means, and means yieldably holding said housing in gripping relationship on the clip means to permit selective pivotal adjustment of the housing and length of cable with respect to the clip means.

4. The invention of claim 3 and further characterized in that said housing includes a stud projecting outwardly on a side substantially opposite of said housing slot, said clip means includes an opening mounted over said stud, and said yieldable means includes a locking ring retaining said stud within the clip means opening.

5. The invention of claim 1 and further including stop means to limit inward displacement of said plunger with respect to said housing to a position where the plunger slot is moved in relation to the housing slot precluding unintended separation of the cable from the cable releasing position.

6. The invention of claim 5 and further characterized in that said stop means includes a circumferential shoulder on the distal end of said plunger, said shoulder axially spaced from the housing open end in said cable gripping position of the plunger, and engaging said open end in said cable releasing position.

References Cited

The following references, cited by the Examiner, are of record in the patented file of this patent or the original patent.

UNITED STATES PATENTS

| | | | |
|---|---|---|---|
| 1,117,277 | 11/1914 | Supplee | 24—81 PA |
| 2,482,625 | 9/1949 | Kunkel | 24—137 A |
| 3,179,991 | 4/1965 | Seal | 24—73 SH |
| 3,271,510 | 9/1966 | Decker et al. | 24—239 |

FOREIGN PATENTS

| | | | |
|---|---|---|---|
| 515,956 | 12/1952 | Belgium | 24—239 |

DONALD A. GRIFFIN, Primary Examiner

U.S. Cl. X.R.

24—239